United States Patent [19]
Gillbrand et al.

[11] Patent Number: 5,720,627
[45] Date of Patent: Feb. 24, 1998

[54] ELECTRICAL EXTENSION

[75] Inventors: Per Gillbrand, Mariefred; Olle Wallander, Stockholm, both of Sweden

[73] Assignee: Saab Automobile Aktiebolag, Sweden

[21] Appl. No.: 647,688

[22] Filed: May 13, 1996

[51] Int. Cl.$^6$ .................................................. H01R 13/72
[52] U.S. Cl. .................................. 439/501; 191/12 R
[58] Field of Search ...................... 191/12 R; 439/501, 439/4

[56] References Cited

U.S. PATENT DOCUMENTS

| | | | |
|---|---|---|---|
| 4,875,878 | 10/1989 | Meyer | 439/501 |
| 4,984,685 | 1/1991 | Douglas | 439/501 |

*Primary Examiner*—Gary F. Paumen
*Attorney, Agent, or Firm*—Ostrolenk, Faber, Gerb & Soffen, LLP

[57] ABSTRACT

An electrical extension particularly for use in a motor vehicle: a cylindrical cable storage container having two cables coiled therein. The cables are connected in series. The first cable is stored as a plurality of spiral turns arranged in a substantially flat disk in the bottom of the container. The second, less flexible cable is stored as a plurality of coils arranged one on top of the other against the interior wall of the container. The second cable is played out initially from the container for connection to an external power source. The first cable is connected to an electrical unit within the vehicle. The container may be stored behind the grille and under the hood of a vehicle. A operable cover sealed to and over the container may be pivoted to the hood.

21 Claims, 3 Drawing Sheets

1

ELECTRICAL EXTENSION

BACKGROUND OF THE INVENTION

This invention relates to electrical extensions, particularly but not exclusively, for use on motor vehicles which have on-board electrical apparatus requiring an electrical power lead for connection to an external power source.

Motor vehicle engines, especially petrol or diesel engines, tend to produce large volumes of emissions when the engines are cool, especially on cold starting. In cold climatic conditions, engine heaters are provided to keep the vehicle engine warm when the vehicle is not in use. Typically, the engine heater is connected via an electrical lead to an electrical power source which may be provided in a garage or at a special location on the street.

The vehicle may be provided with an electrical connector in the front of the vehicle and a separate power lead is run between the power source and the connector. This has the disadvantage that the driver must always remember to carry a power lead. In another alternative design the power lead is provided on the vehicle and is stored within the vehicle on a cable winder. This has the advantage that the cable is always with the vehicle and only has to be connected to the power source. However, cable winders require a relatively large volume and the cable windings can become untidy. Electrically powered cars may also carry a power lead for connecting the vehicle battery to a power source for recharging of the battery.

SUMMARY OF THE INVENTION

An object of the present invention is to provide an improved electrical cable storage unit, especially for use on a vehicle, which is technically simple, requires little space, and is easy to handle.

Accordingly there is provided an electrical extension comprising a cable storage unit having two cables connected in series, including a first cable preferably stored as a plurality of spiral turns arranged in a substantially flat disc and a second less flexible cable stored as a plurality of coils arranged one on top of the other. In use, the second cable is initially played from the storage unit. The cables are connected via a connection moveable along a guide means which helps locate the first cable within the container and helps the cables rewind in an orderly manner. The guide means also provides a mechanical stop for the second cable and hence protects the first cable from being pulled out of the container and further provides a neat and precisely located exit for the second cable.

The spiral turns of the first cable and the coils of the second cable provide an inherently resilient cable structure whose equilibrium state is the stored condition.

Preferably the cable storage unit comprises a cylindrical container.

When used on a motor vehicle, the electrical extension is housed in the container. The first cable, at its other end away from the connection between the two cables, is connected to electrical apparatus within the vehicle. The free end of the second cable has a plug thereon for connection to an electrical source.

Preferably, the container is arranged behind a vehicle body component and has a cover which blends with the component, and the cover can be opened to enable the cable to be played out of the container.

The cable cover may include the vehicle emblem or badge so as to disguise the cover, and the cover may include a seal for sealing the container against external conditions.

Other features and advantages of the present invention will become apparent from the following description of the invention which refers to the accompanying drawings.

BRIEF DESCRIPTION OF THE DRAWINGS

The invention will be described by way of example and with reference to the accompanying drawings in which.

DETAILED DESCRIPTION OF THE INVENTION

Figure 1:
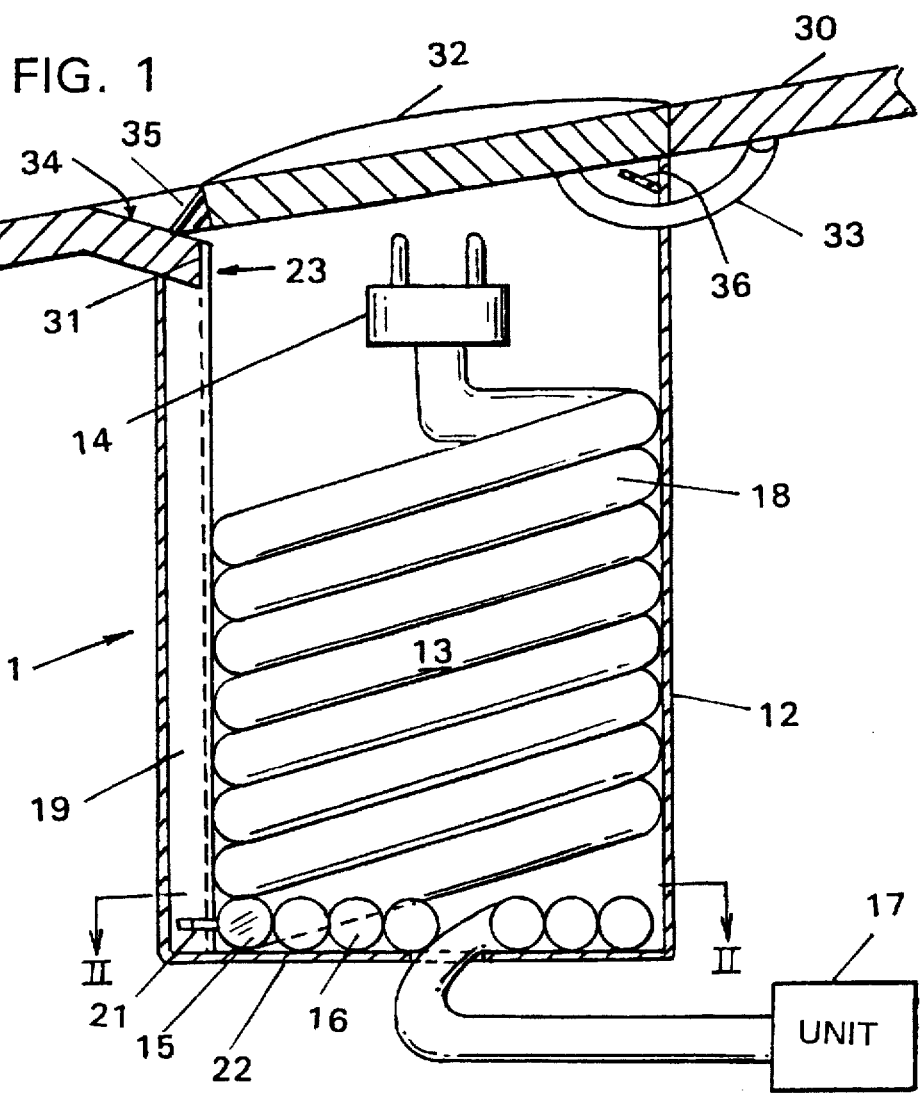
FIG. 1 is a section through a storage unit housing an electrical extension according to the present invention.
Figure 2:
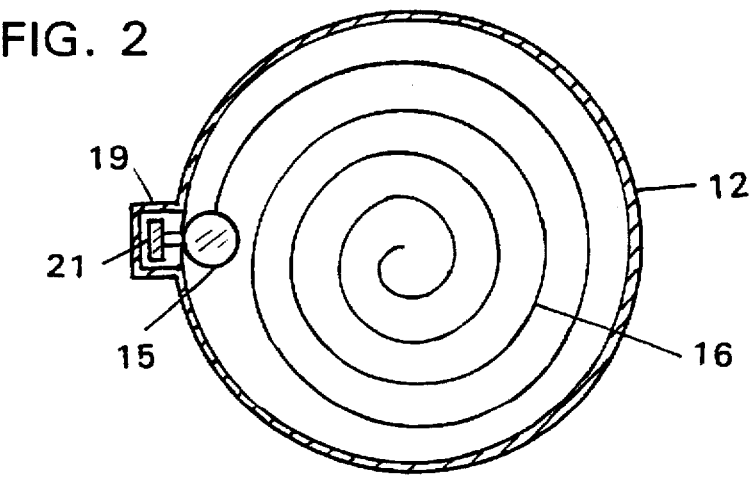
FIG. 2 is a sectional view on the line II—II of FIG. 1 looking downwards.

FIG. 1 and FIG. 2 show an electrical extension 11 comprising a cable storage unit, which is preferably in the form of a cylindrical container 21. An electrical power lead 13 is stored within the container 12 and can be played out of the container and can be connected to a power source (not shown) through a plug 14 fitted to the free end of the lead.

Figure 3:
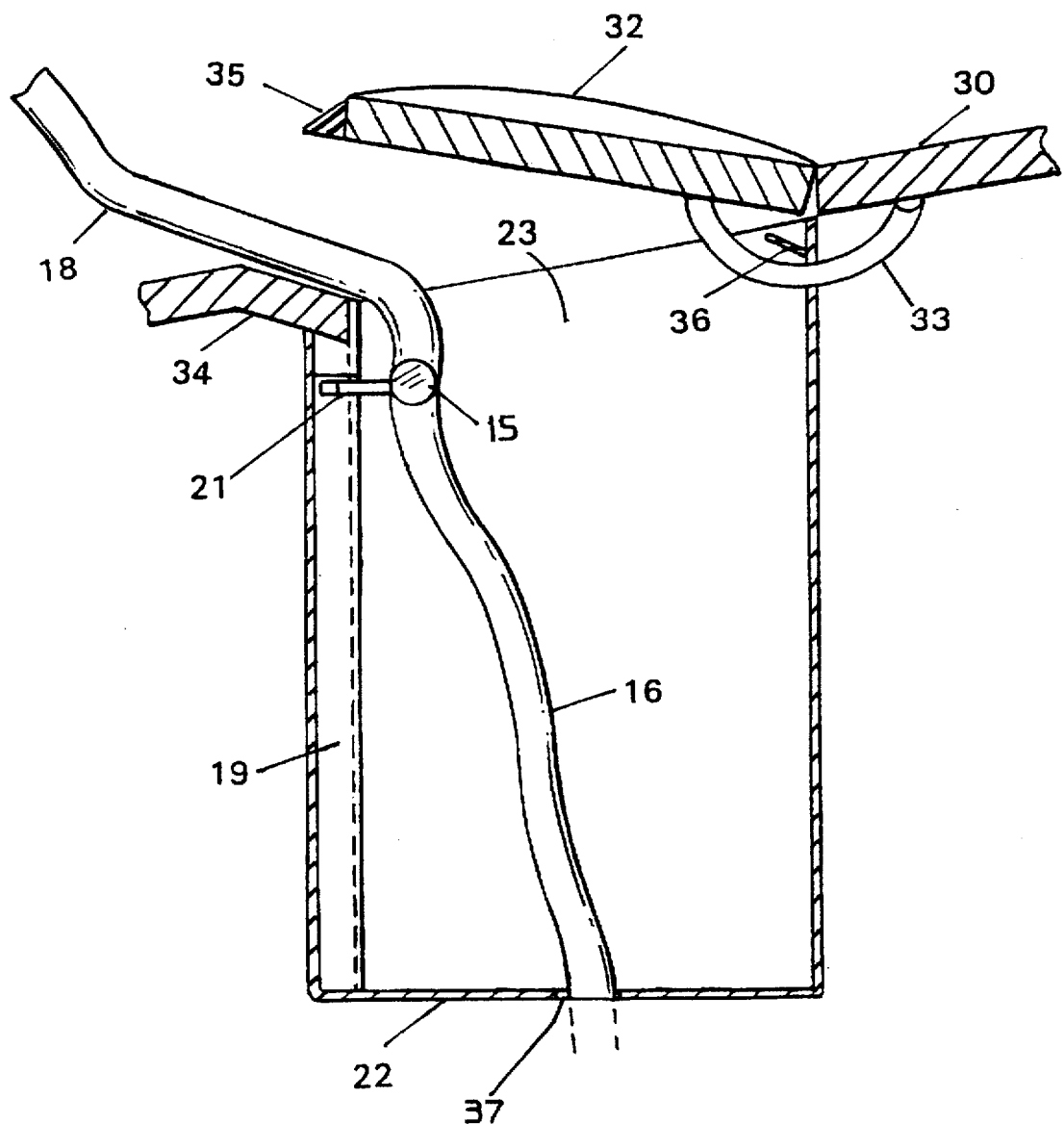
FIG. 3 is a view similar to FIG. 1 showing the extension lead played out.

The electrical power lead 13 comprises two cables connected in series through an electrical connection 15 (also see FIG. 3). The two cables comprise a first cable 16 which is retained within the container and is connected to an electrical apparatus or circuit 17, and a second cable 18 which is less flexible than the first cable 16 and in use is played out of the open mouth 23 of the container 12.

The first cable 16 is stored in the flat bottom 22 of the container 12 in a plurality of spiral turns arranged in a substantially flat disc. The cable end position at the center of the spiral turns passes through the bottom 22 of the container for connection to electrical apparatus 17.

The second cable 18 is stored in a plurality of helical coils which are stacked one upon the other. The helical coils in storage lie against the interior of the cylindrical wall of the container 12 and are thereby restricted from rattling due to vehicle vibrations and remain in good order to facilitate pulling them out of the container.

The cylindrical container 12 has a vertical groove 19 formed on its sidewall to accommodate and guide a guide lug 21 that is formed on the electrical connection 15. This helps locate the first cable 16 within the container, helps the cable 16 rewind in an orderly manner, and prevents twisting of the first cable 16. The groove 19 and guide lug 21 also provide a mechanical stop for the connected end of the second cable 18 and hence protect the first cable 16 from being pulled out of the container 12. They also provide a neat and precisely located exit for the second cable 18 from the container 12. The two cables 16 and 18 are inherently resilient and tend to return to their spiral and coiled forms when released for return into the container 12.

Preferably the electrical power extension is used on a motor vehicle for connecting an electrical device on the vehicle to an external power supply.

Such electrical extensions are particularly useful where the electrical unit 17 is perhaps a heater unit on a motor vehicle. Heater units are utilized for heating the engine directly, or for heating the engine coolant, and/or heating the vehicle catalytic converter and/or the vehicle passenger compartment.

The size of the container 12 will typically be 30–40 cms in height and about 8–10 cms in diameter and it will be required to store about 3–4 meters of electrical power lead. Due to its size the container 12 may well be mounted on the vehicle in the engine compartment in the space between the vehicle grille and the radiator. The unit can be mounted as required. It could be horizontally mounted with its mouth 23 adjacent the grille, but it is preferably mounted vertically. The container 12 may therefore be located so that its mouth 23 is adjacent an aperture 31 in an external body panel 30 of the vehicle, preferably the bonnet or hood over the engine.

The container 12 may be secured to the panel 30 in any suitable way or may be held by some external support so that it immediately underlies the aperture 31 in the body panel 30.

Figure 4:
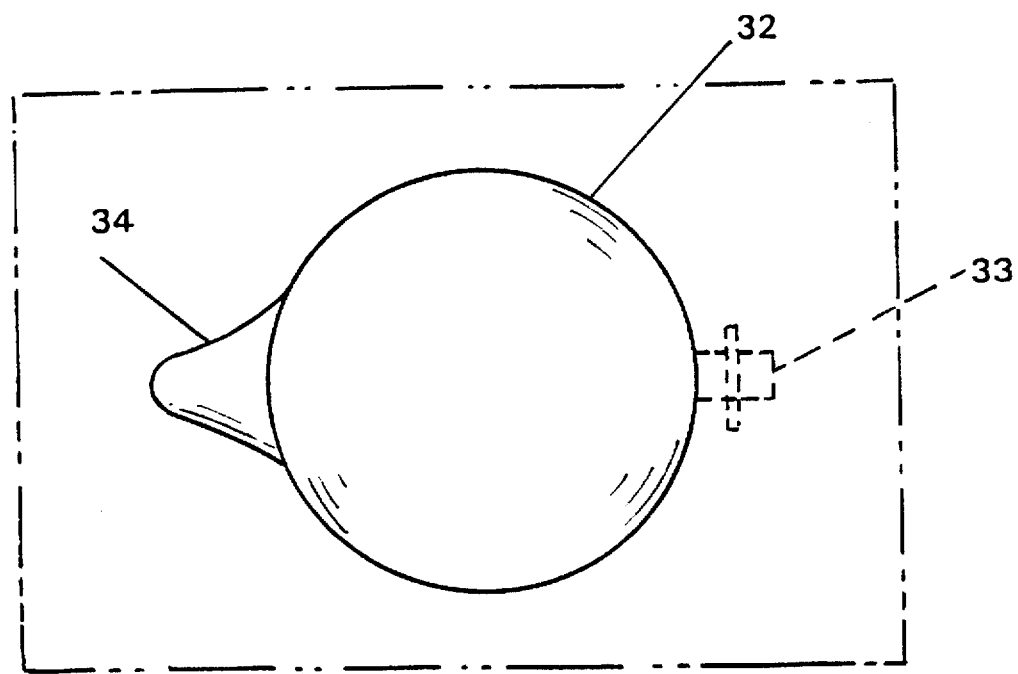
FIG. 4 is a plan view of the cover over the container externally of the vehicle.

In FIGS. 3 and 4, the mouth of the container 12 is open, and the mouth is closed by a cover 32 that is pivoted by a hinge 33 to the panel 30. The cover 32 may be or may support a vehicle emblem or badge or another component that blends into the external surface of the vehicle body in order to disguise the mouth of the container.

A portion of the panel 30 may be formed with an indentation 34 adjacent the aperture 31 which serves to locate the second cable 18 in its played out or pulled out condition. The cover 32 may be provided with a seal 35 which seals the aperture to the body panel 30. Preferably, there is also a further seal 36 around the entire circumference of the cover 32 which may be mounted to the cover 32 or the container 12. The seals may have different shapes, and their task is to prevent external elements such as rain, snow, and dirt from entering the container. It is also advantageous to arrange some kind of drainage aperture 37 at the bottom of the container, as it is difficult to seal the container completely.

During use, when the cables are extended, the first cable 16 remains within the container 12, the connector 15 moves up the guide groove 19, and the second cable 18 may be drawn out of the container as required.

The unit 17 to which the first cable 16 is connected may be an electrical engine heater, a connection with the vehicle electrical system, or any other electrical apparatus associated with the vehicle.

The cable storage unit can have other forms. It could comprise a base plate with a central spigot around which the second cable is coiled, or be of any other form capable of storing the cables. However, supports located radially outwardly of the coil, such as a container, have advantages since the cable may press onto the support in it its rest position and thus prevent rattling. When the cable is pulled out axially, the cable outer diameter will decrease, and the cable can be pulled out of the storage unit easily without too much friction against the support.

The groove and guide lug may also be replaced by any other guide means allowing axial movement only.

Figure 5:
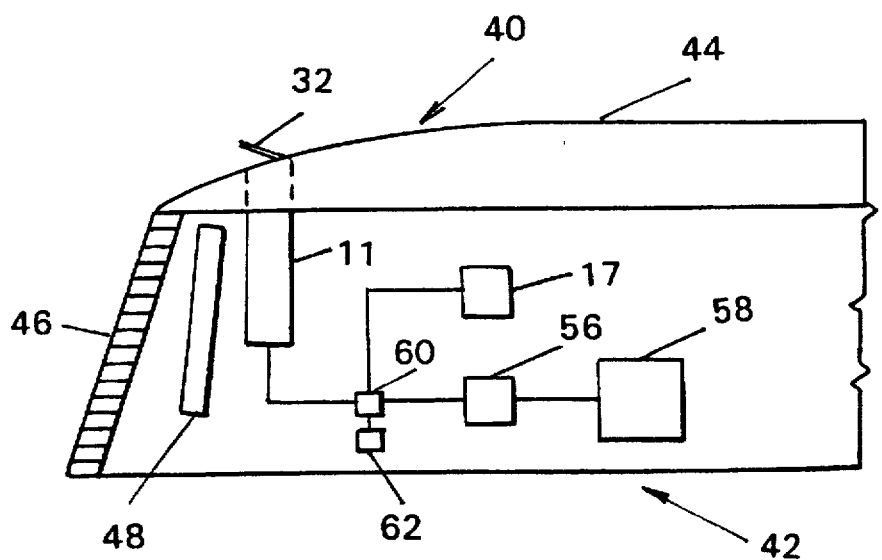
FIG. 5 is a schematic view of the front portion of a vehicle illustrating components of the vehicle and the electrical extension of the invention.

FIG. 5 shows the front portion of a motor vehicle, partially broken away to reveal its contents. The vehicle body 42 includes a hood or bonnet 44 which is in the usual manner pivoted to and opens and closes the top of the body 42. A grille 46 at the front of the body 42 permits air access to a radiator 48 which is also supported in the vehicle behind the grille 46. The container 11 of the extension is disposed in the vehicle body 42 just behind the radiator 48 and the cover 32 of the container 11 is pivoted to the front part of the hood 44.

The extension is connected to electrical apparatus 17 as well as a conventional DC battery 58 via a switching means 60. There is also a AC/DC converter 56 which converts DC to AC for feeding AC from the battery 58 to the power source, or alternatively AC from the power source to DC to the battery 58. A control unit 62 controls the switching means 60 according to input signals such as control signals from the power source, battery voltage in order to prevent the battery from discharging below a predetermined voltage, which voltage may vary according to the ambient temperature.

If the vehicle has a large electrical storage battery and an AC/DC convertor, it may be possible to sell electricity back to the power companies at times of peak demand. In this event the vehicle battery voltage must be monitored so as to prevent the flow of power back into the mains via the cables when the battery voltage reduces to a pre-set value.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electrical extension comprising:
   a cable storage unit having an open area within it for receiving cables;
   a first electrical cable and a second electrical cable, an electrical connection between the first and second cables connecting them in series;
   the second cable being stored in the unit as a plurality of coils, with the coils thereof being arranged one on top of the other, the cables being so placed that the second cable is withdrawn from the unit, and the unit including a passage for the second cable to exit the unit;
   the unit having a guide thereon in which the connection between the cables is supported.

2. The electrical extension of claim 1, wherein the second cable is less flexible than the first cable.

3. The electrical extension of claim 1, wherein the cable storage unit comprises a container, in which the cables are housed.

4. The electrical extension of claim 1, wherein the second cable is stored as a plurality of coils above the first cable in the unit.

5. The electrical extension of claim 4, wherein the first cable is stored as a plurality of spiral turns in the unit.

6. The electrical extension of claim 5, wherein the spiral turns of the first cable in the storage unit are respectively arranged in a substantially flat disk.

7. The electrical extension of claim 6, wherein the cable storage unit comprises a container, in which the cables are housed.

8. The electrical extension of claim 7, wherein the container is cylindrical.

9. The electrical extension of claim 7, wherein the second cable is less flexible than the first cable, and the second cable is sufficiently inflexible that the coils of the second cable press themselves against the interior of the container.

10. The electrical extension of claim 7, wherein the second cable has an end which can be drawn out of the container, and the second cable is adapted to be drawn out of the container.

11. The electrical extension of claim 10, wherein the first cable is adapted to remain within the container before and after the second cable is withdrawn from the container.

12. The electrical extension of claim 7, wherein the container has a wall extending axially and along the interior of which the second cable is coiled; and the guide for the connection between the cables comprises a groove extending axially along the wall of the container enabling the connection between the first and second cables to move axially along the wall of the container.

13. The electrical extension of claim 7, wherein the first cable has an end away from the connection between the cables and that end of the first cable is connectable to an electrical apparatus; the second cable having a free end thereof away from the connection and a plug at the free end of the second cable for connection to an electrical source.

14. The electrical extension of claim 7, further comprising the container having a cover thereover adapted to blend with the component, the cover of the container being openable to provide access to the second cable to be played out the container.

15. The electrical extension of claim 15, the cover further comprising a seal thereon for sealing to the container and the groove to seal against external conditions.

16. In a motor vehicle including an electrical apparatus, the extension of claim 13, and the end of the first cable being connected to the electrical apparatus within the vehicle.

17. In the motor vehicle of claim 16, the vehicle having a body component and the container of the extension being arranged near the body component; the container having a cover thereover adapted to blend with the component, the cover of the container being openable to provide access to the second cable to be played out the container.

18. In the motor vehicle of claim 17, the cover comprising an emblem or badge.

19. In the motor vehicle of claim 17, the vehicle having an engine grille and a cylindrical container being disposed behind the engine grille, the vehicle having a hood over the engine and the cover of the container being pivoted to the vehicle hood.

20. In the motor vehicle of claim 17, the cover further comprising a seal thereon for sealing to the container and the groove to seal against external conditions.

21. In the motor vehicle of claim 17, an AC/DC converter for converting DC to AC for feeding to the power source to which the second cable is attached;

the vehicle including a battery and control means to prevent the battery from discharging below a predetermined potential.

* * * * *